Dec. 2, 1952     D. J. DOUGLAS     2,620,289
METHOD OF SECURING FLEXIBLE SHEETS
TO RELATIVELY STIFF BACKINGS
Filed Aug. 27, 1945     2 SHEETS—SHEET 1
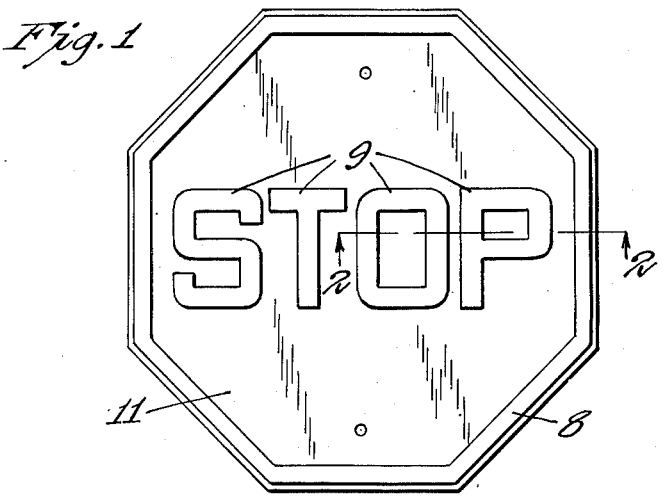
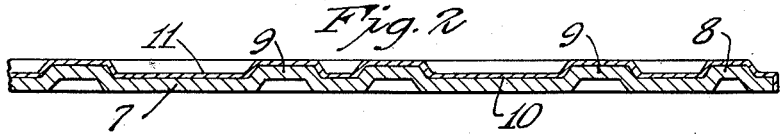
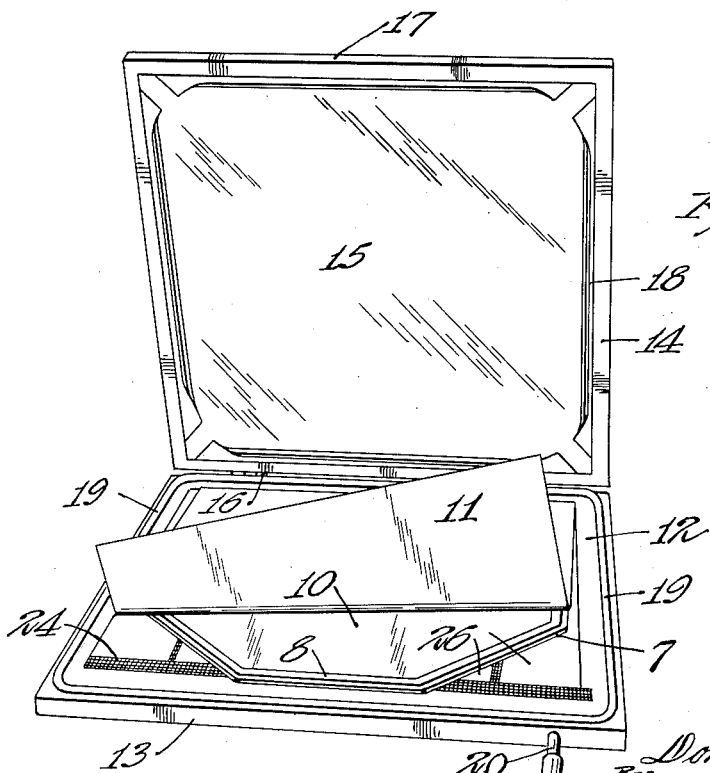
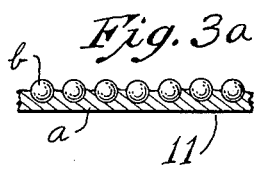
Inventor
Donald J. Douglas
By Carpenter, Abbott, Coulter & Kinney
Attorneys Dec. 2, 1952        D. J. DOUGLAS        2,620,289
METHOD OF SECURING FLEXIBLE SHEETS
TO RELATIVELY STIFF BACKINGS
Filed Aug. 27, 1945        2 SHEETS—SHEET 2
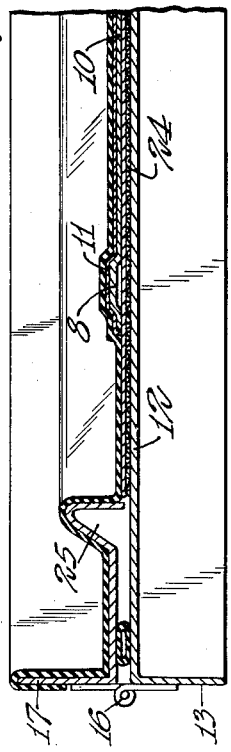
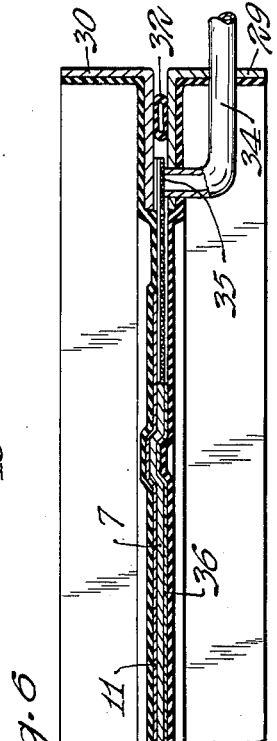
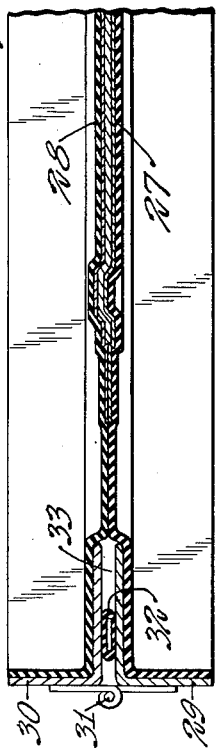
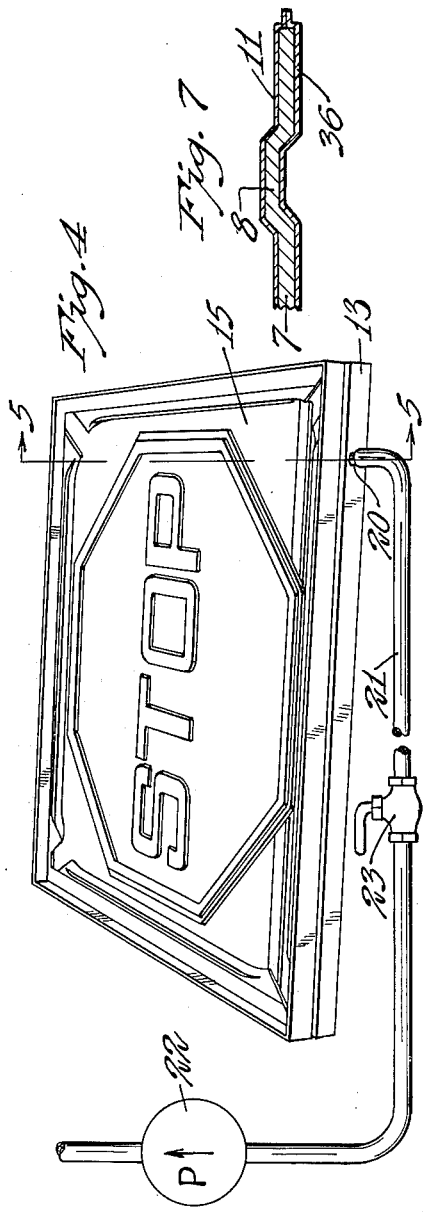
Inventor
Donald J. Douglas
By Carpenter, Abbott, Coulter & Kinney
Attorneys Patented Dec. 2, 1952

2,620,289

UNITED STATES PATENT OFFICE 2,620,289

METHOD OF SECURING FLEXIBLE SHEETS TO RELATIVELY STIFF BACKINGS

Donald J. Douglas, Mendota Township, Dakota County, Minn., assignor to Minnesota Mining & Manufacturing Company, St. Paul, Minn., a corporation of Delaware Application August 27, 1945, Serial No. 612,917

12 Claims. (Cl. 154—106)

This invention relates to the art of securing preformed, flexible sheet materials to relatively rigid backings by the use of special adhesives and is particularly, although not exclusively, adapted for use where both the sheet materials and backings are substantially impervious to air.

Flexible films for decorating and preserving, or for affording other desirable surface finishes to a wide variety of products, have been manufactured economically as sheet materials and for many uses are more uniform and otherwise superior to surface coats applied directly to the permanent backing as a liquid by ordinary methods of spraying, dipping or brushing followed by drying or heat treatment of the product. The cost of applying liquids by such ordinary methods is increased by the need for air conditioning equipment for the drying and work rooms and also by the necessity for high temperature ovens adapted to contain the work where durable enamel finishes are to be baked on. A further major portion of the cost is due to the large amount of time and labor required to apply one or more coats of liquid directly. Delays incident to the drying and heat treating are also objectionable under some circumstances.

Previously known methods of applying preformed films and adhesives have had extremely limited fields of use and their cost has been high because of the diffculties attendant upon the elimination of air pockets between the films and backings where the entrapped air cannot escape through or into the films or backings, or where the surfaces to be covered are embossed or otherwise so shaped as to require irregular stretching of the films to be bonded thereto.

It is an object of my invention to provide a novel and economical method for applying preformed films or sheet materials to the surfaces of supporting bodies whereby the foregoing difficulties are eliminated.

Another object is to provide a process of this kind which is adapted to be performed by the use of relatively inexpensive equipment and which reduces the time consumed in applying and permanently bonding preformed films or sheet materials to backings.

A further and particular object is to provide an economical process for bonding preformed, durable and/or weatherproof, synthetic resin films to relatively rigid backings by means of adhesives which are adapted to be activated at temperatures not substantially exceeding 212° F.

Other objects will appear and be more fully pointed out in the following specification and claims.

With these objects in view, according to the present invention, the films are bonded to their backings or supporting bodies by the use of an adhesive of the type that may be dried and subsequently activated and caused to take a permanent set by the application of a moderate degree of heat. A coat of such adhesive may be applied to the film or backing, or to both the film and backing and then the coated surface is dried before the film is applied to the backing. As the next step, the film is spread upon the backing with the dry adhesive coat between them and the work is placed in a vacuum chamber wherein pressure is applied to the outer surface of the film to cause it to conform to the backing while air is withdrawn from between the contacting surfaces. Where the film and backing are substantially impervious to air, it is important that the adhesive coated surface or surfaces shall be sufficiently dry to permit ready slipping in contact with the backing and while under the applied pressure, thus preventing the sealing off of air pockets which would be difficult to eliminate. After withdrawing all air from between the surfaces to be bonded together and while continuing the application of atmospheric pressure to the film, preferably from 10 to 15 lbs. per square inch, the work is heated sufficiently to activate and set the adhesive and thereby securely bond the film to its backing. Finally air is admitted to the vacuum chamber and the work is removed therefrom.

ADHESIVES

Adhesives or cements suitable for my purposes are known; see for example, the Palmquist and Douglas Patent No. 2,543,799, issued March 6, 1951.

A preferred cement having a urea-formaldehyde-butanol resin base may be made according to the following formula:

| | Parts by weight |
|---|---|
| Urea-formaldehyde-butanol resin solution | 100 |
| Heavy blown castor oil (such as Baker Oil Co. No. 15 heavy blown castor oil which has a viscosity of 5,000 to 10,000 centipoises at 25° C. and an iodine value of 60) | 30 |
| Isopropyl alcohol | 48 |
| Catalyst | 1.5 |

The urea-formaldehyde-butanol resin solution is made as follows: To 1000 parts of 37% formaldehyde solution, add ammonium hydroxide (28% solution) until the pH is between 7 and 8; this requires approximately 20 parts of ammonia. Add 240 parts of urea, and heat the mixture in a suitable kettle at 85° C. for 50 to 55 minutes or until the urea is all dissolved. Apply a vacuum and drop the temperature to 55 to 60° C., and then add 592 parts of n-butyl alcohol, 60 parts petroleum xylol (such as "Velsicol," a high aromatic content petroleum solvent obtainable from the Velsicol Corporation, Chicago, Ill.), and 6 parts of orthophosphoric acid (90%) and continue heating and distilling under vacuum, removing the water but returning the organic solvent to the still. When no more water comes over, cautiously distill out a portion of the solvent, to produce a viscous, clear solution containing 58% by weight of the alcohol-soluble thermosetting urea-aldehyde resin. This solution is diluted with n-butyl alcohol to 50% solids content for use.

The catalyst is an acid alkyl ester of phosphoric acid made by heating three mols of methyl alcohol with one mol of phosphorous pentoxide in the presence of ethyl ether as a heat exchange medium; heating is continued until a clear liquid is obtained, whereupon n-butyl alcohol is added in sufficient amount, and the ether removed by fractionation, to produce a catalyst containing 50% volatiles.

In making the cement, the resin solution, oil and catalyst are added to the alcohol in a paddle-type mixer and the mass is stirred until homogeneous. As thus prepared, the solution may be stored in closed containers at ordinary room temperature for long periods of time without deterioration. The solution may be applied by brushing, dipping or spraying. By the application of mild heat, drying of the freshly applied coat may be hastened or such heating may be used to remove "slow grab" or tackiness where a slight excess of plasticizer has been used in the adhesive.

When first applied and the solvent allowed to evaporate, this cement is somewhat tacky to the touch, and will adhere to surfaces which may be lightly pressed for an appreciable time thereagainst. However, on further brief drying, this property of "slow grab" is lost, and the cement layer will not then adhere, for example to flexible films or to the surfaces of the backings to which they may be applied, as herein elsewhere described, without further activation by application of heat.

In the preparation of resinous cements generally for my purposes, the ratio of the thermosetting resin to plasticizer must be so chosen as to avoid, on the one hand, the formation of permanently soft, tacky or smeary adhesives obtained by the use of too large a proportion of plasticizer and, on the other hand, the formation of hard, non-tacky, brittle films which will not form an adherent bond with the sheet material because of the use of too small a proportion of thermosetting resin. These ratios will, of course, vary with changes in the particular resins and/or plasticizers employed. Resins and plasticizers must also be selected on the basis of mutual compatibility. Thus in the example described above in detail, wherein heavy blown castor oil is used in conjunction with a particular thermosetting type of soluble urea-formaldehyde-butanol resin, the amount of oil may be varied from about 20 to about 42 parts based on 50 parts of the urea-formaldehyde-butanol resin while still providing "slow grab" properties, adequate bonding and toughness, although a more desirable range is from about 30 to 36 parts of the oil.

Even after a period of several hours and after the "slow grab" property has disappeared, such a cement coat may be made to form a highly adherent bond to the surfacing film by applying the film under light pressure and moderate temperature, for example at 10 to 15 lbs. per square inch and 200° F.

PREFERRED SYNTHETIC RESIN FILMS

A wide variety of surface finishing materials may be bonded to backings by the use of adhesives of the character described, but when a substantial degree of elasticity or stretch as well as flexibility and resistance to weathering is required, synthetic resin films such as those presently to be described are best suited for the purpose.

*Example 1*

This may be a two-layer film consisting of a tough under layer of thermoplastic plasticized polyvinyl butyral and a hard, resistant outer or surface layer of a pigmented heat-reacted plasticized thermosetting alcohol-soluble urea-formaldehyde resin. For example, the film may be made by forming an under layer of 10 grains per 24 square inches of a composition containing 30 parts of polyvinyl butyral ("Vinylite XYNC," produced and sold by Carbide and Carbon Chem. Corp.) and 20 parts of heavy blown castor oil, and a second layer of 20 grains per 24 square inches of a pigmented, plasticized urea-formaldehyde resin containing 100 parts of an alcohol-soluble heat-reactive urea-formaldehyde-butanol resin, 20 parts of a soft plastic alkyd resin made from sebacic acid, diethylene glycol, and glycerol, and 80 parts of titanium dioxide pigment, together with a suitable phosphate type catalyst for the urea-aldehyde resin. After casting from solution in organic solvent, and removing the solvent by evaporation, heating of the composite film hardens the outer or surface layer but leaves the inner supporting and cushioning layer flexible.

*Example 2.—Reflex light reflector sheet material*

Material of this character may be applied according to the present invention to signs, markers or other supporting bodies. It may comprise a flexible and impervious reflective support having a layer of minute glass beads imbedded in the front face. This material is described in detail in U. S. Patents No. 2,354,048 and No. 2,354,049, both issued July 18, 1944, being available commercially as a product sold in association with the trade-mark "Scotchlite."

It will be evident that numerous other types of films and sheet materials may be applied according to the present invention.

The operation of holding the film in contact with the backing during the setting of the adhesive is best performed by the use of a vacuum bag or fluid pressure actuated diaphragm in contact with the film. An example of apparatus of this character is hereinafter described by reference to the accompanying drawing and is further described and claimed in the application of Edward P. Davis and myself Serial No. 612,918, filed concurrently herewith, now abandoned in favor of Serial No. 69,936, filed January 8, 1949.

Referring to the accompanying drawings which illustrate, by way of example and not for the purpose of limitation, suitable apparatus for applying surface finishing films to an embossed sign or road marker according to my invention:

Figure 1 is a front elevational view of the sign;

Fig. 2 is an enlarged fragmentary sectional view of the same, taken on the line 2—2 of Fig. 1;

Fig. 3 is a perspective view showing a vacuum chamber in open position, with a sign in place therein and also showing a film to be bonded to the front face of the sign partially covering the latter;

Fig. 3a is an enlarged fragmentary sectional diagram of the film;

Fig. 4 is a perspective view showing the same vacuum chamber closed as in operation and also showing, diagrammatically, suitable connections with a suction pump;

Fig. 5 is a fragmentary cross sectional view taken approximately on the line 5—5 of Fig. 4 and on a larger scale;

Fig. 6 is a similar cross sectional view showing a modified form of the vacuum chamber having flexible diaphragms adapted to apply pressure to both faces of the work, and Fig. 7 is an enlarged fragmentary section through the marginal portion of the work after removal from the chamber shown in Fig. 6.

The sign shown in detail in Figs. 1 and 2 has a backing 7 comprising a metal stamping of common type having an embossed marginal bead 8 and letters 9 projecting from its front face 10. A surface finishing film 11 is bonded to the backing 7 and extends continuously over the entire face 10 according to the present invention. This film 11 may comprise a sheet of either of the preformed materials hereinbefore described in detail, or of other suitable material having sufficient elasticity to permit stretching to conform to the irregularly embossed backing. In the present embodiment, the film 11 is formed of a flexible impervious backing a, in one side of which is embedded a layer of glass beads b, as shown diagrammatically in Fig. 3a.

As shown in Figs. 3, 4 and 5, a vacuum chamber is provided to receive and enclose the sign. This chamber comprises a rectangular base 12 formed with marginal flanges 13 and a top closure having a frame 14 carrying a flexible and elastic diaphragm 15 adapted to overlie the film 11 and sign on the base. The frame 14 is adapted to be closed upon the marginal portions of the base 12 and is preferably connected to the base by hinges 16 at one side. To impart desirable rigidity to the frame 14, the latter is formed along its outer edges with flanges 17 and along its inner edges with flanges 18. The marginal portions of the diaphragm 15 are secured in continuous sealing relation to the outer surfaces of the members forming the frame 14 by suitable means, such as a suitable cement or adhesive. Within the hollow rectangle formed by the frame 14 the diaphragm 15 may be subjected to atmospheric pressure on its exterior surface and the suction created within the chamber over its inner surface. This diaphragm is preferably constructed from a synthetic or natural rubber composition. To seal the joint between the adjoining faces of the frame 14 and base 12, a continuous compressible gasket 19 is provided on the upper surface of the base 12. This gasket may be formed from soft rubber tubing. To afford sealing pressures on the gasket greatly in excess of atmospheric pressure when a vacuum is created within the chamber, the gasket 19 is located near the outer margin of the frame 14.

Communicating with the interior of the vacuum chamber is a suction pipe 20 adapted to be connected to a flexible pipe or hose 21 extending to a suction pump 22 (Fig. 4), and a valve 23 may be provided to control the flow of air to and from the pipe 20 through the hose 21. A layer of woven wire screening 24 overlies the intake end of the pipe 20 and extends upon the base 12 to provide minute passages for air leading to and from all portions of the space 25 between the base 12 and diaphragm 15 when the chamber is closed. A series of thin spaced strips 26 are mounted on top of the screen 24 for contact with the bottom face of the backing 7.

Before placing the sign and film in the vacuum chamber the back face of the film or front face of the sign, or both of such faces, are coated with an adhesive of the character hereinbefore described and the adhesive is allowed to dry sufficiently so that its exposed surface loses its tacky, adhesive property until activated by heating. Then, with the chamber open, as indicated in Fig. 3, the sign is placed on the supporting strips 26 overlying the base 12 and then the film 11 is laid flat on the upper, normally front face 10 of the sign. The film may be in the form of a rectangular sheet of such size as to allow it to project slightly from the several sides of the sign within the chamber. Then the top closure comprising the frame 14 and diaphragm 15 is closed against the gasket 19, and with the hose 21 connecting the pipe 20 to the pump 22 the latter is operated to exhaust air from the vacuum chamber. This causes the diaphragm 15 to be drawn inward upon the entire upper surface of the film 11 and to press the dry adhesive coated surface of the film upon the sign with sufficient force to stretch the film into the several recesses between embossed or raised areas and into contact with all angularly disposed and concave surface areas. Both the diaphragm 15 and film 11 are sufficiently elastic to conform exactly to the irregularly embossed surface of the sign while all air is drawn from between the film 11 and backing 7. This exact shaping of the diaphragm 15 to the surface 10 is indicated in Fig. 4 and is obtained automatically by the force of atmospheric pressure, preferably equal to from 10 to 15 lbs. per square inch absolute pressure, which is applied uniformly to the exterior surface of the diaphragm 15 and thence to the film. The total absence of adhesion between the film and backing at this stage insures free stretching of the film to fit the irregular face of the backing and complete and quick escape of air from the pockets which would otherwise be sealed off by contact of the film with the tops of the bead 8 and letters 9.

Subsequently, while continuing the application of such pressure, the vacuum chamber and/or the film and backing therein are heated to a sufficiently elevated temperature to activate and set the adhesive. When using an adhesive such as that hereinbefore described in detail the final activation and setting may be accomplished by raising the temperature to from 200° to 212° F. for a brief period of time. For this purpose the vacuum chamber may be submerged in hot water or otherwise heated as by applying radiant heat to the outer surface of the diaphragm 15 for the required period of time. Heat treatment at approximately 210° F. for from one-half to five minutes is sufficient to complete the operation when using the preferred adhesives.

It will be understood that a partial vacuum is maintained in the chamber during the heat treatment and that a hose 21 may be provided which is sufficiently long to permit the transfer of the chamber to and from a tank of hot water or other heater, without discontinuing the operation of the suction pump in case such operation is desirable or necessary due to leakage of air into the chamber.

Upon completion of the heat treatment air is admitted through the pipe 20 to the vacuum chamber. This permits the opening of the chamber and removal of the work therefrom. Excess film material which may have been left projecting from the edges of the sign is finally trimmed off, leaving the continuous film 11 permanently and securely bonded to the face of the backing 7. Subsequently, a contrasting color coat may be applied to the embossed surfaces of the letters 9 and marginal bead 8, if desired, by the use of a liquid coated roller or by other printing or coating means.

Where it is desired to bond preformed films or sheet materials to both faces of a sign or other backing, the modified vacuum chamber shown in Fig. 6 may be used according to my process. This chamber comprises oppositely disposed, flexible, elastic diaphragms 27 and 28 mounted respectively on frames 29 and 30. Hinges 31 connect these frames together at one side and a gasket 32 is arranged, like the gasket 19, to seal the connection between the opposed frame surfaces. The margins of the diaphragms 27 and 28 are secured in sealing relation to the outer surfaces of their respective supporting frames so that an air-tight chamber 33 between the diaphragms is formed when the frames are brought together against the gasket 32, the outer faces of the diaphragms and frames being subject to atmospheric pressure. Atmospheric pressure exerted on the exterior areas of the frames 29 and 30 creates compressive forces on the gasket 32 to effect an exceptionally tight seal.

A pipe 34 communicates with the interior of the chamber and a strip 35 of fine wire screen extends over and from the inner end of this pipe toward the interior portion of the chamber. This strip separates the diaphragms and affords a multiplicity of minute passages which insure the free flow of air to and from the inner end of the pipe 34. The end of the screen strip 35 remote from the pipe 34 is preferably located adjacent to an edge of the sign backing 7 and between projecting margins of the surface films 11 and 36 when the latter are in place in the vacuum chamber. Projecting from the frame 29, the pipe 34 is adapted to be connected to a suction pump or other apparatus for creating a vacuum within the chamber, as in the case of the pipe 20 (Fig. 4).

A preformed film for covering the back face of the sign or backing is indicated by the numeral 36 in Figs. 6 and 7. This film may be bonded to the backing simultaneously with the bonding of the film 11 to the front face by the procedure presently to be described. Before placing the free films and backing in the vacuum chamber, coats of adhesive of the type hereinbefore described are applied to and dried on the surfaces of the films and/or backing to be brought together. With the frame 30 carrying the diaphragm 28 in open position with respect to the frame 29 and diaphragm 27, the backing 7 may be assembled with the films 11 and 36, the dried, non-tacky adhesive coats being placed between the respective films and backing. For example, the film 36 may be first spread on the inner face of the diaphragm 27, adhesive coated side up, the backing 7 then placed on the film 36 and then the film 11 may be spread on the top or front face of the backing, adhesive coated side down. Obviously, this assembly order may be reversed, starting with the film 11 laid face down on the diaphragm 27.

The vacuum chamber is then closed to bring the diaphragm 28 in contact with the top film (film 11 as shown in Fig. 6) and the suction pump is operated to exhaust air from the closed chamber and from between the surface films and backing. This causes the films and diaphragms to conform exactly to the respective faces of the backing, as indicated in Fig. 6. The chamber and/or work contained therein is then subjected to suitable heat treatment to activate and set the adhesive, as hereinbefore described. Subsequently air is admitted to the chamber and the work is removed therefrom. The operations of cutting away any excess film material that may have been left projecting from the edges of the sign and coloring the embossed areas may be performed later by known means.

Where a supply of water or other fluid under adequate pressure is available, a suction-creating device of the ejector type may be substituted for the suction pump 22. For many types of signs, including street and highway markers, it is desirable to use as the front face film 11, reflex light reflector sheet material such as that described in the foregoing "Example 2" and as the back face covering a preformed synthetic resin film such as that of "Example 1," hereinbefore described. Many other types and arrangements of preformed surface finishing materials may be applied to signs and other bodies according to my invention. It will be understood that the size and shape of the vacuum chamber may be varied between wide limits to accommodate bodies of various sizes and shapes together with the films to be applied thereto.

Where the body to which a film is to be applied is too large to be inserted in a vacuum chamber, a film may be applied to any selected and suitable area of the body by the use of a single frame, such as the frame 29, with its diaphragm 27, gasket 32 and connections for creating a vacuum between the diaphragm and work. For example, such simple apparatus may be used to cement a prefabricated emblem film on the side or other surface of a railway car, airplane or other large vehicle.

It will be evident that the apparatus for carrying out the sequence of operations described is simple and inexpensive and that my method of procedure saves much time and labor as compared with ordinary methods of applying preformed films. A part of the saving is due to the elimination of hand work in the stretching of the surface finishing films to cause them to conform to the surfaces of the backings while drawing off air from between the films and backings, particularly where both of the latter are impervious to air. My success in this respect is the result, at least in part, of applying an adhesive of the character described and causing it to dry sufficiently so that it has a non-tacky or non-adherent surface over which the air may be readily withdrawn when under atmospheric pressure between the film and backing. I further simplify and effect economies in the procedure by utilizing adhesives which may be activated and set by heating to a moderate temperature of from 200° to 212° F. when subject to light pressures not exceeding one atmosphere.

Having described my invention, what I claim as new and desire to protect by Letters Patent is:

1. The method of securing a flexible stretchable air-impervious synthetic resin sheet to a relatively rigid air-impervious backing which comprises applying to at least one of the surfaces to be brought together a coating of heat-activatable heat-setting adhesive capable of being dried to a smooth non-tacky state and subsequently activated and set by heat, causing the said coating to dry sufficiently to afford a smooth non-adhesive contact surface, then spreading the sheet on the backing with the said non-tacky coating of adhesive between the sheet and the backing, then withdrawing air from between the sheet and backing while applying atmospheric pressure to the exterior surface of the said sheet to cause it to conform to the backing and heating the work sufficiently to activate and set the adhesive in bonding relation to the sheet and backing.

2. The method of claim 1 in which the adhesive comprises a plasticized amino-aldehyde resin.

3. The method of securing a flexible stretchable air-impervious synthetic resin sheet to a relatively rigid air-impervious backing which comprises applying to at least one of the surfaces to be brought together a coating of heat-activatable heat-setting adhesive capable of being dried to a smooth non-tacky state and subsequently activated and set by heating at an elevated temperature not exceeding 212° F., causing the said coating to dry sufficiently to afford a smooth non-adhesive contact surface, then spreading the sheet on the backing with the said non-tacky coating of adhesive between the sheet and the backing, then withdrawing air from between the sheet and backing while applying atmospheric pressure to the exterior surface of the said sheet to cause it to conform to the backing and heating the work sufficiently to activate and set the adhesive in bonding relation to the sheet and backing.

4. The method of claim 3 in which the backing is a metal plate whose surface to which the sheet is adhered is made irregular by a plurality of depressions and protuberances.

5. The method of claim 3 in which the backing is an embossed metal plate.

6. The method of claim 3 in which the heating step comprises immersion of the work in hot water.

7. The method of claim 6 in which the backing is a metal plate whose surface to which the sheet is adhered is made irregular by a plurality of depressions and protuberances.

8. The method of claim 6 in which the backing is an embossed metal plate.

9. The method of securing a flexible stretchable air-impervious synthetic resin sheet, in one side of which is embedded a layer of glass beads, to a surface of an embossed metal plate with the unbeaded surface of the sheet adjacent the plate, which comprises applying to at least one of the surfaces to be brought together a coating of heat-activatable heat-setting adhesive capable of being dried to a smooth non-tacky state and subsequently activated and set by heating at an elevated temperature not exceeding 212° F., causing the said coating to dry sufficiently to afford a smooth non-adhesive contact surface, then spreading the sheet on the plate with the said non-tacky coating of adhesive between the sheet and the plate, then withdrawing air from between the sheet and plate while applying atmospheric pressure to the exterior surface of the said sheet to cause it to conform to the embossed surface of the plate and heating the work by immersion in hot water sufficiently to activate and set the adhesive in bonding relation to the sheet and plate.

10. The method of claim 9 in which the said elevated temperature ranges from 200° to 212° F.

11. The method of claim 10 in which the adhesive comprises a plasticized amino-aldehyde resin.

12. The method of securing a flexible stretchable air-impervious synthetic resin sheet, in one side of which is embedded a layer of glass beads, to a surface of an air-impervious embossed metal plate with the unbeaded surface of the sheet adjacent the plate, which comprises applying to at least one of the surfaces to be brought together a coating of heat-activatable heat-setting adhesive capable of being dried to a smooth non-tacky state and subsequently activated and set by heating at an elevated temperature ranging from 200° to 212° F., causing the said coating to dry sufficiently to afford a smooth non-adhesive contact surface, then spreading the sheet on the plate with the said non-tacky coating of adhesive between the sheet and the plate, then withdrawing air from between the sheet and plate while applying atmospheric pressure to the exterior surface of the sheet to cause it to conform to the embossed surface of the plate and heating the work sufficiently to activate and set the adhesive in bonding relation to the sheet and plate.

DONALD J. DOUGLAS.

REFERENCES CITED

The following references are of record in the file of this patent:

UNITED STATES PATENTS

| Number | Name | Date |
|---|---|---|
| 892,702 | Wyman | July 7, 1908 |
| 2,088,352 | Vierkotter | July 27, 1937 |
| 2,311,547 | Hutchison | Feb. 16, 1943 |
| 2,331,296 | Bendix | Oct. 12, 1943 |
| 2,354,916 | Hurt | Aug. 1, 1944 |
| 2,397,827 | Williams | Apr. 2, 1946 |
| 2,406,738 | Brophy | Sept. 3, 1946 |
| 2,432,928 | Palmquist | Dec. 16, 1947 |
| 2,440,584 | Heltzer et al. | Apr. 27, 1948 |
| 2,456,093 | Swedlow | Dec. 14, 1948 |